Figure 1:
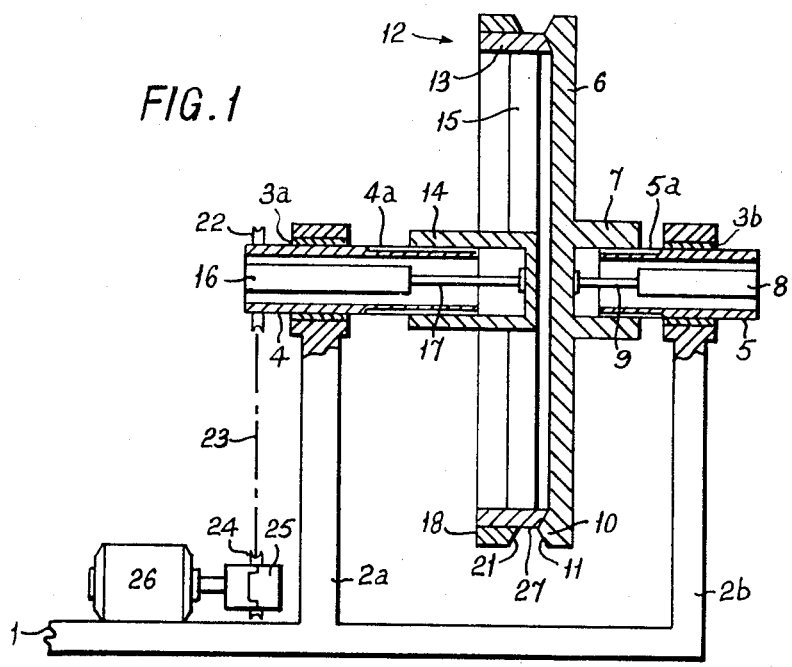

United States Patent [19]
Bell et al.

[11] 3,741,262
[45] June 26, 1973

[54] MANUFACTURE OF BEAD WIRES FOR TYRES

[75] Inventors: Robert Graham Bell, Hartlebury, England; James Edward Collins; Gwylfa George Griffiths, both of Swansea, Wales

[73] Assignee: National Standard Company Limited, Kidderminster, Worcestershire, England

[22] Filed: Mar. 10, 1971

[21] Appl. No.: 122,905

[30] Foreign Application Priority Data
Mar. 12, 1970  Great Britain .................. 11,894/70

[52] U.S. Cl. .................................. 140/92.2, 245/1.5
[51] Int. Cl. ....................... B21f 3/04, B29h 17/32
[58] Field of Search ................. 140/92.2; 242/116; 245/1.5

[56] References Cited
UNITED STATES PATENTS

| | | | |
|---|---|---|---|
| 1,986,094 | 1/1935 | Allan | 140/92.2 |
| 2,930,539 | 3/1960 | Bremer | 140/92.2 |
| 1,993,970 | 3/1935 | MacMurray | 140/92.2 |

Primary Examiner—Lowell A. Larson
Attorney—Johnson, Dienner, Emrich, Verbeck & Wagner

[57] ABSTRACT

In a machine for manufacturing a tire bead wire or bead strip comprising a rotatable, circular former provided with a peripheral recess, the former is divided into two parts capable of being moved relative to one another in the direction of the axis of rotation of the former, each of these parts comprising a part of the wall of said peripheral recess. Preferably, when the two parts are separated a clear axial gap exists between the parts so that a completed bead wire or strip can drop from the former between the two separated parts.

4 Claims, 4 Drawing Figures

MANUFACTURE OF BEAD WIRES FOR TYRES

This invention relates to the manufacture of bead reinforcement means for tyres, the reinforcement means being in the form of a plurality of turns of wire (to form a bead wire) or a plurality of turns of metal strip (to form a bead strip).

It is known to manufacture a bead reinforcement means for a tyre by winding a continuous length of wire or metal strip into a peripheral recess in a rotatable, circular former. The peripheral recess is shaped to conform to part of the desired cross-sectional configuration of the bead wire or bead strip. In hitherto known formers of this kind, it has been the custom to make the former radially collapsible so that the finished bead wire or bead strip can be readily removed from the peripheral recess of the former. This, however, is a time-consuming operation and the present invention aims to provide an improved former for a machine for making a bead reinforcement means.

According to the invention in a machine for manufacturing a tyre bead reinforcement means comprising a rotatable, circular former provided with a peripheral recess, the former is divided into two parts capable of being moved relative to one another in the direction of the axis of rotation of the former, each of these parts comprising a part of the wall of said peripheral recess.

The two parts of the former are mounted for rotation about a common axis, and at least one of the parts is slidable in the direction of said axis for the purpose of separating or bringing together the two parts. Preferably, both parts of the former are axially movable, and when the two parts are separated a clear axial gap exists between the parts so that a completed reinforcement means can drop from the former between the two separated parts.

Relative movement of the two parts of the former may be effected by means of pneumatic or hydraulic cylinder means which may be mounted in the rotatable shaft of one or both of the two parts, in which case the pneumatic or hydraulic cylinder means would be supplied with fluid working medium via suitable rotary connection means.

Figure 4:
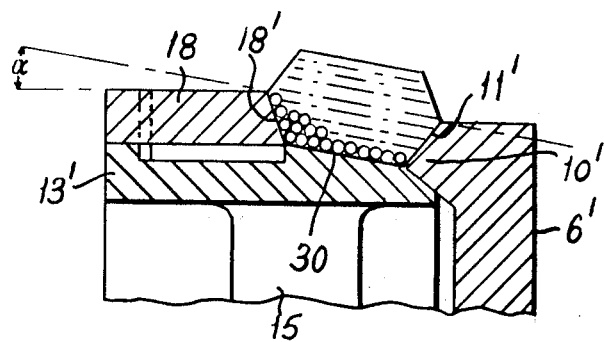
Figure 2:
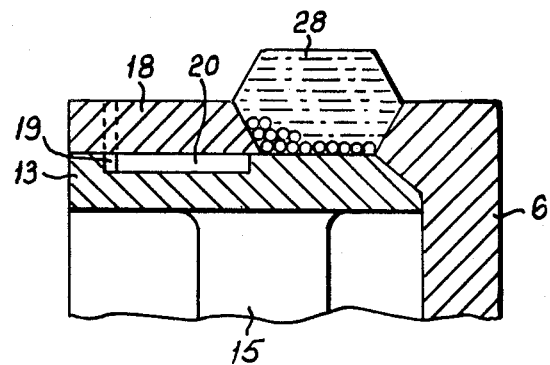
Figure 3:
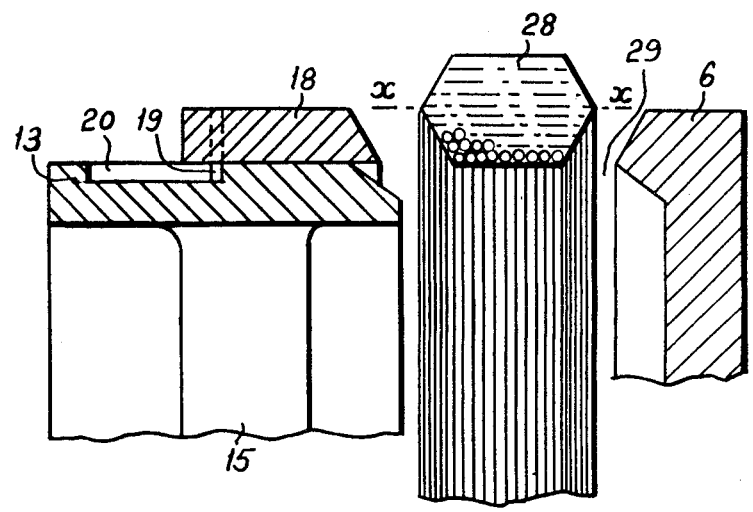

The invention will now be described in greater detail, by way of example, with reference to the accompanying drawings, in which:

FIG. 1 is a schematic side view of a machine for manufacturing a tyre bead wire in accordance with the invention, FIG. 2 is a sectional view, on an enlarged scale, of part of the former of the machine of FIG. 1, showing the two parts of the former in their closed position, FIG. 3 is a view similar to FIG. 2, but showing the two parts of the former spaced apart, and FIG. 4 is a view similar to FIG. 2 of a modified form of the machine.

The machine shown in FIGS. 1 to 3 comprise a base plate 1 on which are mounted two spaced apart uprights 2a, 2b. Hollow shafts 4 and 5 are mounted for rotation in bearings 3a, 3b in the uprights 2a and 2b, respectively, with the axes of the two shafts horizontal and in alignment with one another. A disc 6 provided with a hub 7 is mounted on a splined portion 5a of the shaft 5, the hub 7 being rotatable with the shaft 5 but slidable therealong. A pneumatic cylinder assembly 8 is mounted at one end of the shaft 5 and has its piston rod 9 connected to the disc 6. On its face remote from the pneumatic cylinder assembly 8, the disc 6 has a circumferential ridge 10 which has a frusto-conical surface 11 with an apex angle of 120°. The disc 6 with its circumferential ridge 10 forms one part of the former of the machine.

The reference numeral 12 generally designates the other part of the former of the machine. The part 12 comprises a hollow cylinder 13 connected to a concentric sleeve 14 by a web or spokes 15. The sleeve 14 is slidably mounted on a splined portion 4a of the shaft 4 so that the cylinder 13 can rotate with the shaft 4 but is slidable therealong. A pneumatic cylinder assembly 16 is mounted inside the shaft 4 and has its piston rod 17 joined to an end of the sleeve 14. A cylindrical sleeve 18 is mounted on the hollow cylinder 13, the internal diameter of the sleeve 18 being such that the latter is a sliding fit on the external surface of the hollow cylinder 13. A peg 19 (see FIG. 2) secured to the sleeve 18 engages in a slot 20 formed in the hollow cylinder 13, so that the sleeve 18 can rotate with the cylinder 13 but is capable of limited axial sliding movement relative thereto. The sleeve 18 has a frusto-conical end wall 21 with an apex angle of 120°.

At its end remote from the sleeve 14, the shaft 4 is provided with a driving pulley 22. The pulley 22 is joined by an endless belt 23, indicated by a chain line, to a pulley 24 driven via a magnetic clutch 25 by an electric motor 26.

In use of the machine above described, the former parts 6 and 12 are moved towards each other by the pneumatic cylinder assemblies 8 and 16, respectively, so that the parts occupy the positions shown in FIGS. 1 and 2. With the sleeve 18 displaced to the left relative to the cylinder 13, as shown in FIGS. 1 and 2, a recess 27 is formed in the periphery of the assembled former parts. This recess is defined by the peripheral surface of the hollow cylinder 13 and by the frusto-conical walls 11 and 21. With the former parts 6 and 12 in these positions, the former is rotated by means of the motor 26 and a wire is laid in the recess 27 employing any suitable means (not shown) for laying on and guiding the wire. In this way a bead wire 28 (see FIG. 2) of hexagonal cross-section is built up on the former.

When the bead wire 28 has been completed, the pneumatic cylinders 8 and 16 are actuated to separate the disc 6 from the hollow cylinder 13, as shown in FIG. 3. As the parts separate, the hollow cylinder 13 is drawn through the sleeve 18 to an extent limited by the engagement of the peg 19 in the slot 20, so that the sleeve 18 pushes the completed bead wire off the peripheral surface of the cylinder 13. When the parts have been separated to the positions shown in FIG. 3, the completed bead wire 28 is free to drop from the drum in the space 29 between the parts 6 and 13.

The machine described above is intended particularly for winding a bead wire of hexagonal section. It will be appreciated that by suitably shaping the walls 11 and 21 it is possible to wind bead wires of other configurations.

If desired, the disc 6 and the former part 13 may each be constructed from a plurality of relatively adjustable parts enabling adjustment of the bead wire diameter to be made.

The axis $x$—$x$ of the cross-section of the bead wire 28 is parallel to the axis of the bead wire as a whole. If it is desired to make an angled bead wire, in which the axis $x$—$x$ is inclined at an angle $\alpha$ to the axis of the bead wire as a whole, the machine shown in FIGS. 1 to 3 may be modified as shown in FIG. 4.

In FIG. 4, the cylinder 13 of FIGS. 1 to 3, is replaced by a hollow cylinder 13' having a part 30 of its external surface in the form of a frustum of a cone of apex angle $2\alpha$. The circumferential ridge 10' of the disc 6' has a frusto-conical surface 11' with an apex angle of $120°-2\alpha$, and the frusto-conical end wall 18' of the sleeve 18 has an apex angle of $120+2\alpha$. In all other respects, the machine may be constructed in the same way as the machine of FIGS. 1 to 3.

Although the machine described above with reference to the drawings are intended for winding tyre bead reinforcement means in the form of bead wires, it will be appreciated that machines of the same basic design may be employed for winding bead strips consisting of a plurality of superimposed turns of metal strip of rectangular cross-section. In this case the recess 27 is conveniently of rectangular cross-sectional shape.

What is claimed is:

1. In a machine for manufacturing a tyre bead reinforcement means comprising a rotatable circular former provided with a peripheral recess, the former being divided into three circular parts all of which are mounted for rotation about a common axis, a first of said parts having a surface defining the bottom surface of said peripheral recess and the second and third parts having respective surfaces defining the opposed side walls of said peripheral recess, said second part being mounted on the first part for limited sliding movement relative thereto in the direction of said common axis, and said first and third parts being slidable in the direction of said common axis for the purpose of separating or bringing together the said first and third parts.

2. A machine as claimed in claim 1, in which said first and third parts are capable of separating a distance greater than the width of a completed bead reinforcement means to provide a clear axial gap between the first and third parts so that a completed bead reinforcement means can drop from the former between the two separated parts.

3. A machine as claimed in claim 1, in which the relative movement of the first and third parts of the former is effected by means of pneumatic or hydraulic cylinder means.

4. A machine as claimed in claim 3, in which the pneumatic or hydraulic cylinder means is mounted in the rotatable shaft of one or both of the first and third parts.

* * * * *